US008182389B2

(12) United States Patent
Koizumi

(10) Patent No.: US 8,182,389 B2
(45) Date of Patent: May 22, 2012

(54) DRIVING FORCE TRANSMITTING DEVICE, IMAGE FORMING APPARATUS, AND DRIVING FORCE TRANSMITTING METHOD

(75) Inventor: Susumu Koizumi, Izunokuni (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 596 days.

(21) Appl. No.: 12/365,074

(22) Filed: Feb. 3, 2009

(65) Prior Publication Data

US 2009/0203494 A1 Aug. 13, 2009

Related U.S. Application Data

(60) Provisional application No. 61/026,105, filed on Feb. 4, 2008.

(51) Int. Cl.
*F16H 55/32* (2006.01)
*G03G 15/08* (2006.01)

(52) U.S. Cl. .......................................... 476/72; 399/254

(58) Field of Classification Search .................. 399/167, 399/117, 254, 256, 263
See application file for complete search history.

(56) References Cited

U.S. PATENT DOCUMENTS

| 6,801,736 B2 * | 10/2004 | Senda | 399/167 |
| 2005/0158077 A1 * | 7/2005 | Kwon | 399/167 |
| 2006/0188273 A1 * | 8/2006 | Takesawa et al. | 399/27 |

FOREIGN PATENT DOCUMENTS

| JP | PH10-281188 | 10/1998 |
| JP | PH10-318292 | 12/1998 |
| JP | P2001-083753 | 3/2001 |

* cited by examiner

*Primary Examiner* — David Gray
*Assistant Examiner* — Billy J Lactaoen
(74) *Attorney, Agent, or Firm* — Patterson & Sheridan, LLP

(57) ABSTRACT

A technique that makes it possible to switch high-torque power transmission with a compact and simple configuration is provided. A driving force transmitting device that transmits driving force received by one of a first rotating body and a second rotating body to the other includes: the first rotating body; a first engaging section that is provided in the first rotating body; the second rotating body that rotates around a rotating shaft the same as that of the first rotating body; elastically deforming sections that are arranged in the second rotating body; and a second engaging section that is provided in the second rotating body and elastically supported by the elastically deforming sections to engage with the first engaging section and is disengaged from the first engaging section by centrifugal force involved in the rotation of the second rotating body.

16 Claims, 10 Drawing Sheets

DRIVING FORCE TRANSMITTING DEVICE, IMAGE FORMING APPARATUS, AND DRIVING FORCE TRANSMITTING METHOD

CROSS-REFERENCE TO RELATED APPLICATION

This application is based upon and claims the benefit of priority from U.S. provisional application 61/026,105 filed on Feb. 4, 2008, the entire contents of which is incorporated herein by reference.

TECHNICAL FIELD

The present invention relates to a technique for transmitting driving force.

BACKGROUND

As a configuration for switching transmission of driving force in an image forming apparatus and the like, there are known configurations employing a one-way clutch, a torque limiter, an electromagnetic clutch, and the like.

However, when the one-way clutch is used, normal rotation and reverse rotation of a driving source need to be switched in order to control presence or absence of transmission of the driving force to the one-way clutch.

When the torque limiter is used, since presence or absence of transmission of rotational driving force thereof is switched on the basis of torque, the torque limiter cannot be applied when it is desired to change a driving force transmission path according to the number of revolutions.

When the electromagnetic clutch is used, a large arrangement space is required and, moreover, cost for adopting the electromagnetic clutch is relatively high.

Therefore, driving force transmitting mechanisms that switch power transmission using centrifugal force are disclosed in, for example, JP-A-10-318292 and JP-A-10-281188.

However, in the technique disclosed in JP-A-10-318292, power transmission is performed by frictional force when the number of revolutions exceeds a predetermined number of revolutions. The technique is not suitable for high-torque driving force transmission. Besides, heat is generated during the power transmission.

In the technique disclosed in JP-A-10-281188, switching of transmission of driving force from a driving shaft to a driven shaft is realized by a steel ball, movement of which in a rotation radius direction is controlled by magnetic force. However, noise is likely to occur when the steel ball comes into contact with a recess. Further, when it is attempted to realize high-torque driving force transmission, it is necessary to increase diameters of the steel ball and a guide hole and deepen the recess. However, such a configuration is likely to prevent a reduction in size of an entire apparatus.

SUMMARY

It is an object of an embodiment of the present invention to provide a technique that makes it possible to switch high-torque power transmission with a compact and simple configuration.

In order to solve the problems, according to an aspect of the invention, there is provided a driving force transmitting device that transmits driving force received by one of a first rotating body and a second rotating body to the other, the device including: the first rotating body; a first engaging section that is provided in the first rotating body; the second rotating body that rotates around a rotating shaft same as that of the first rotating body; elastically deforming sections that are arranged in the second rotating body; and a second engaging section that is provided in the second rotating body and elastically supported by the elastically deforming sections to engage with the first engaging section and moves to an outer side in a rotation radius direction with centrifugal force involved in the rotation of the second rotating body to be thereby disengaged from the first engaging section.

According to another aspect of the invention, there is provided an image forming apparatus including: a developing roller of a developing device that is driven by driving force from a driving source; an agitating unit that agitates a developer in the developing device; a first engaging section that rotates integrally with one of the developing roller and the agitating unit; elastically deforming sections that rotate integrally with the other of the developing roller and the agitating unit; and a second engaging section that is provided in the other of the developing roller and the agitating unit and elastically supported by the elastically deforming sections to engage with the first engaging section and moves to an outer side in a rotation radius direction with centrifugal force involved in the rotation of the other of the developing roller and the agitating unit to be thereby disengaged from the first engaging section.

According to still another aspect of the invention, there is provided an image forming apparatus including: a developing roller of a developing device that is driven by driving force from a driving source; and an agitating unit that is driven by the driving force transmitted from the developing roller via a continuously variable transmission mechanism and agitates a developer in the developing device.

According to still another aspect of the invention, there is provided an image forming apparatus including: at least one of a photoconductive member and a developing roller of a developing device that are driven by driving force from a first driving source; and an agitating unit that is driven by driving force from a second driving source different from the first driving source and agitates a developer in the developing device.

According to still another aspect of the invention, there is provide a driving force transmitting method in an image forming apparatus including a developing roller of a developing device that is driven by driving force from a driving source, an agitating unit that agitates a developer in the developing device, a first engaging section that rotates in association with one of the developing roller and the agitating unit; elastically deforming sections that rotate in association with the other of the developing roller and the agitating unit; and a second engaging section that is provided in the other of the developing roller and the agitating unit and elastically supported by the elastically deforming sections to engage with the first engaging section, the method including moving the second engaging section to an outer side in a rotation radius direction with centrifugal force involved in the rotation of the other of the developing roller and the agitating unit to thereby disengage the second engaging section from the first engaging section.

DETAILED DESCRIPTION

Embodiments of the present invention are explained below with reference to the accompanying drawings.

First Embodiment

Figure 1:
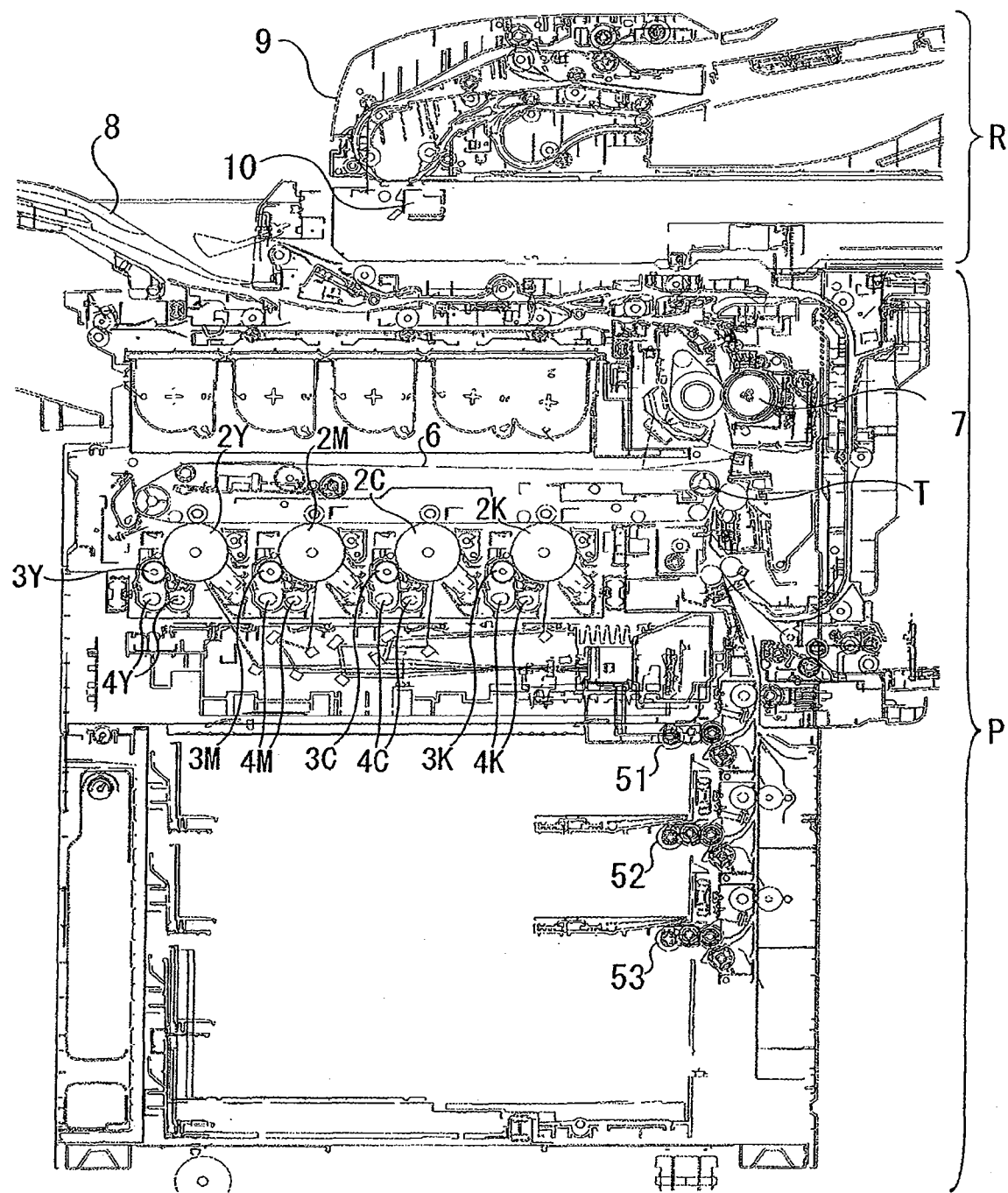
FIG. 1 is a longitudinal sectional view of a schematic configuration of an image forming apparatus (MFP: Multi Function Peripheral) according to a first embodiment of the present invention.

FIG. 1 is a longitudinal sectional view of a schematic configuration of an image forming apparatus (MFP: Multi Function Peripheral) according to a first embodiment of the invention.

As shown in FIG. 1, the image forming apparatus according to this embodiment includes an image scanning unit R and an image forming unit P.

The image scanning unit R has a function of scanning images of a sheet original document and a book original document.

The image forming unit P has a function of forming a developer image on a sheet on the basis of an image scanned from an original document by the image scanning unit R, image data transmitted from an external apparatus to the image forming apparatus, and the like.

The image scanning unit R includes an auto document feeder (ADF) 9 that can automatically feed an original document to a predetermined image scanning position. The image scanning unit R scans, with a scanning optical system 10, images of an original document automatically fed by the auto document feeder 9 and an original document placed on a document table.

The image forming unit P includes pickup rollers 51 to 53, photoconductive members 2Y to 2K, developing rollers 3Y to 3K, mixers 4Y to 4K, an intermediate transfer belt 6, a fixing device 7, and a discharge tray 8.

An overview of copy processing is explained below as an example of processing in the image forming apparatus according to this embodiment.

First, sheets picked up from a cassette by any one of the pickup rollers 51 to 53 are fed into a sheet conveying path. The sheets fed into the sheet conveying path are conveyed in a predetermined conveying direction by plural roller pairs.

Images of plural sheet original documents automatically fed by the auto document feeder 9 continuously are scanned by the scanning optical system 10 in the predetermined image scanning position.

Subsequently, on the basis of image data of the images scanned from the original documents by the image scanning unit R, electrostatic latent images are formed on photoconductive surfaces of photoconductive members 2Y, 2M, 2C, and 2K for transferring developer images of yellow (Y), magenta (M), cyan (C), and black (K) onto the sheets.

Subsequently, developers agitated by the mixers 4Y to 4K (corresponding to agitating units) in the developing device are supplied to the photoconductive members 2Y to 2K, on which the electrostatic latent images are formed as explained above, by the developing rollers (so-called magnet rollers) 3Y to 3K. Consequently, the electrostatic latent images formed on the photoconductive surfaces of the photoconductive members 2Y, 2M, 2C, and 2K are visualized.

Developer images formed in the photoconductive members 2Y, 2M, 2C, and 2K in this way are transferred onto a belt surface of the intermediate transfer belt 6 (so-called primary transfer). The developer images carried by the rotation of the intermediate transfer belt 6 are transferred onto the conveyed sheets in a predetermined secondary transfer position T.

The developer images transferred onto the sheets are heated and fixed on the sheets by the fixing device 7.

The sheets on which the developer images are heated and fixed are conveyed through the conveying path by plural conveying roller pairs and sequentially discharged onto the discharge tray 8.

Details of configurations of a driving force transmitting device according to this embodiment and a driving force transmitting mechanism including the same are explained below.

Figure 2:
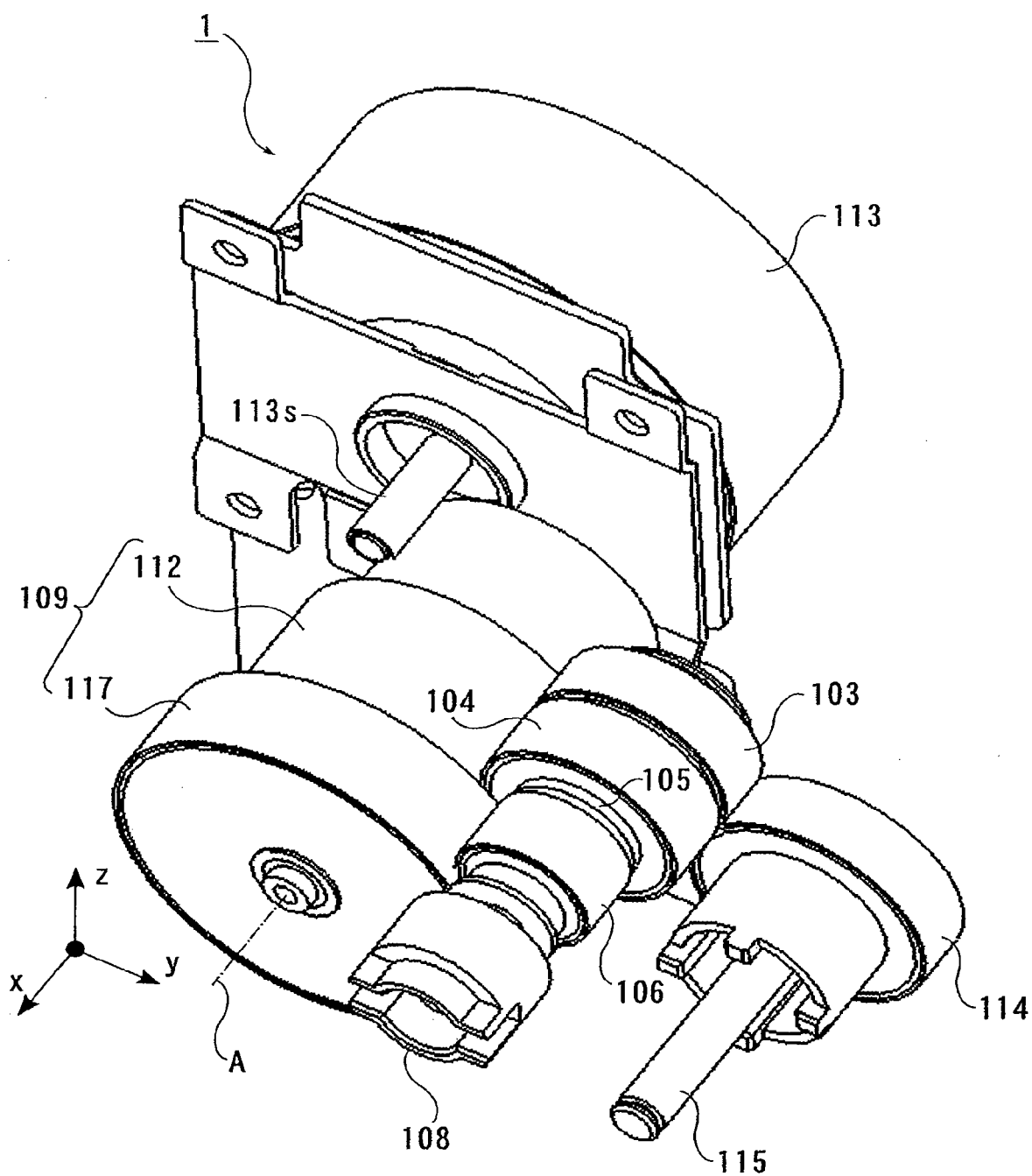
FIG. 2 is a schematic perspective view of a driving force transmitting mechanism around a developing device in the image forming apparatus according to the embodiment.
Figure 3:
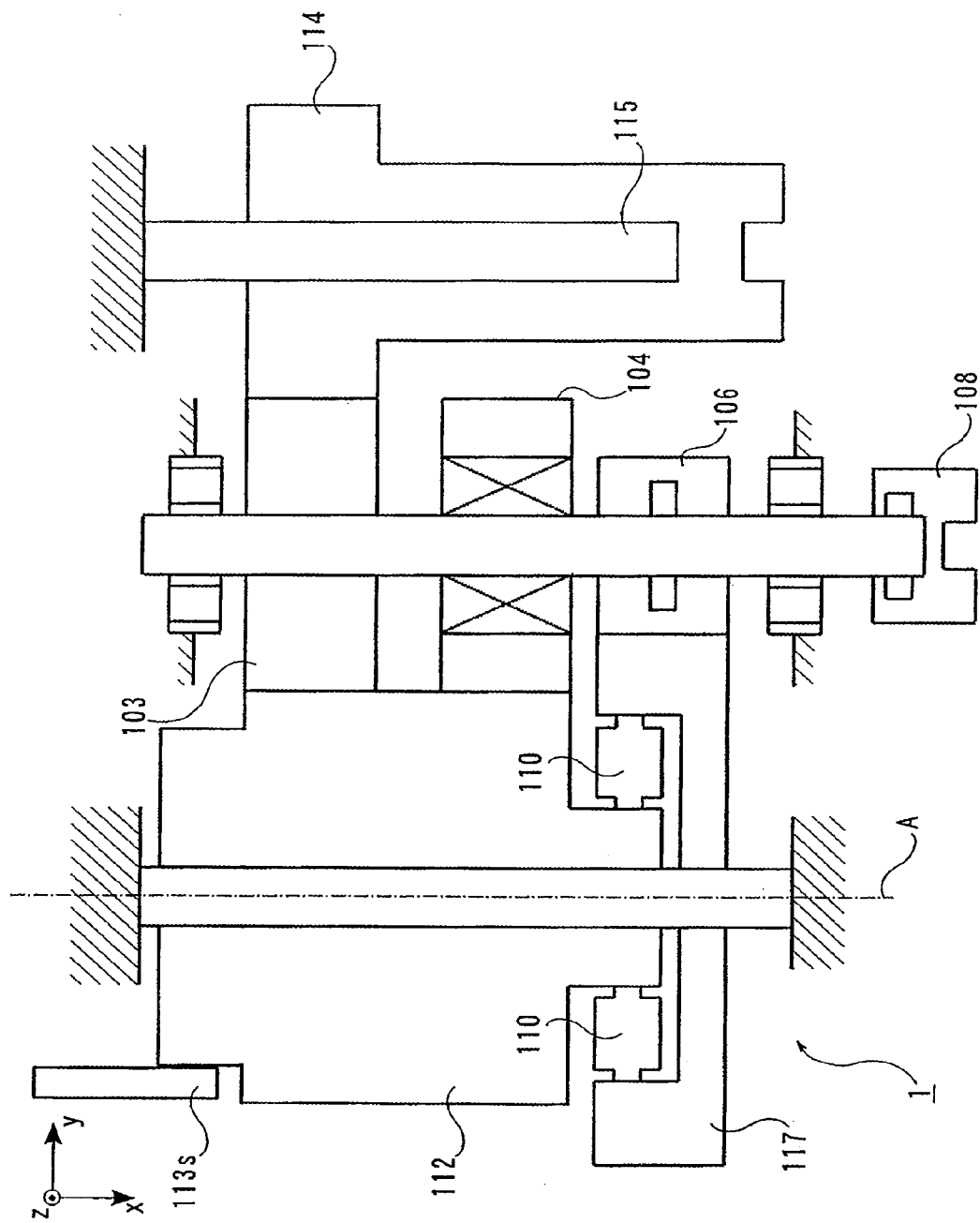
FIG. 3 is a plan view of a schematic configuration of the driving force transmitting mechanism around the developing device in the image forming apparatus according to the embodiment.
Figure 4:
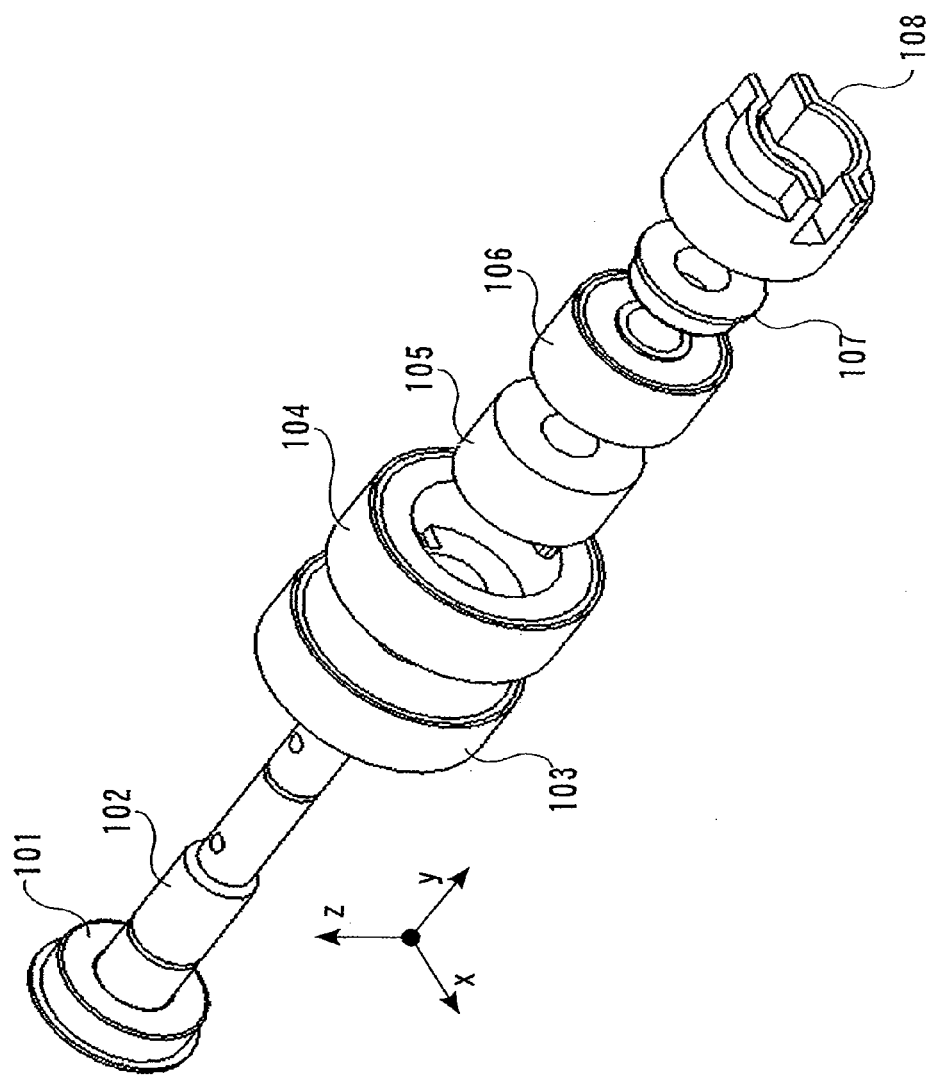
FIG. 4 is a disassembled perspective view of a configuration around a mixer output shaft.
Figure 5:
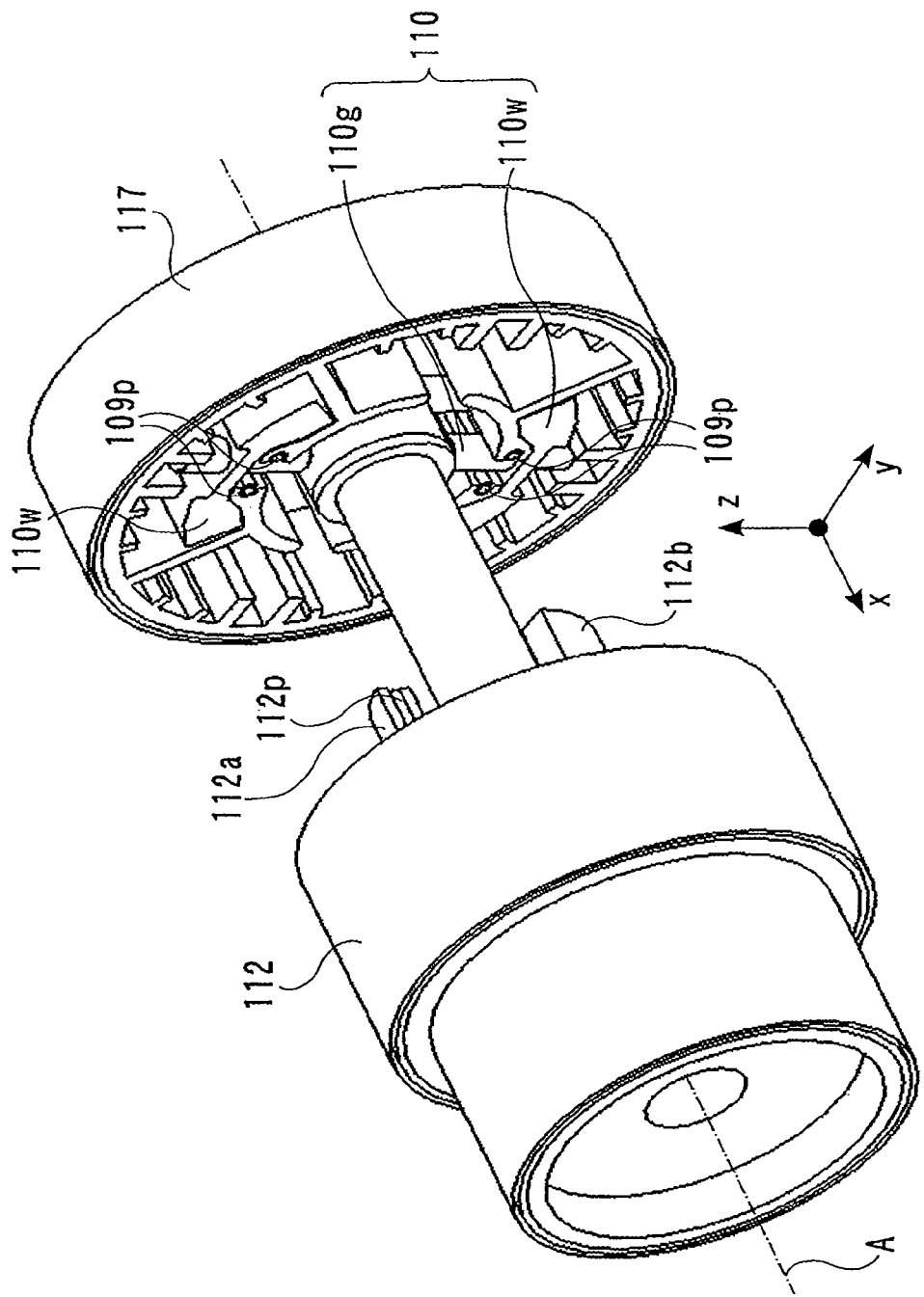
FIG. 5 is a disassembled perspective view of a configuration around a driving force transmitting device according to the first embodiment.
Figure 6:
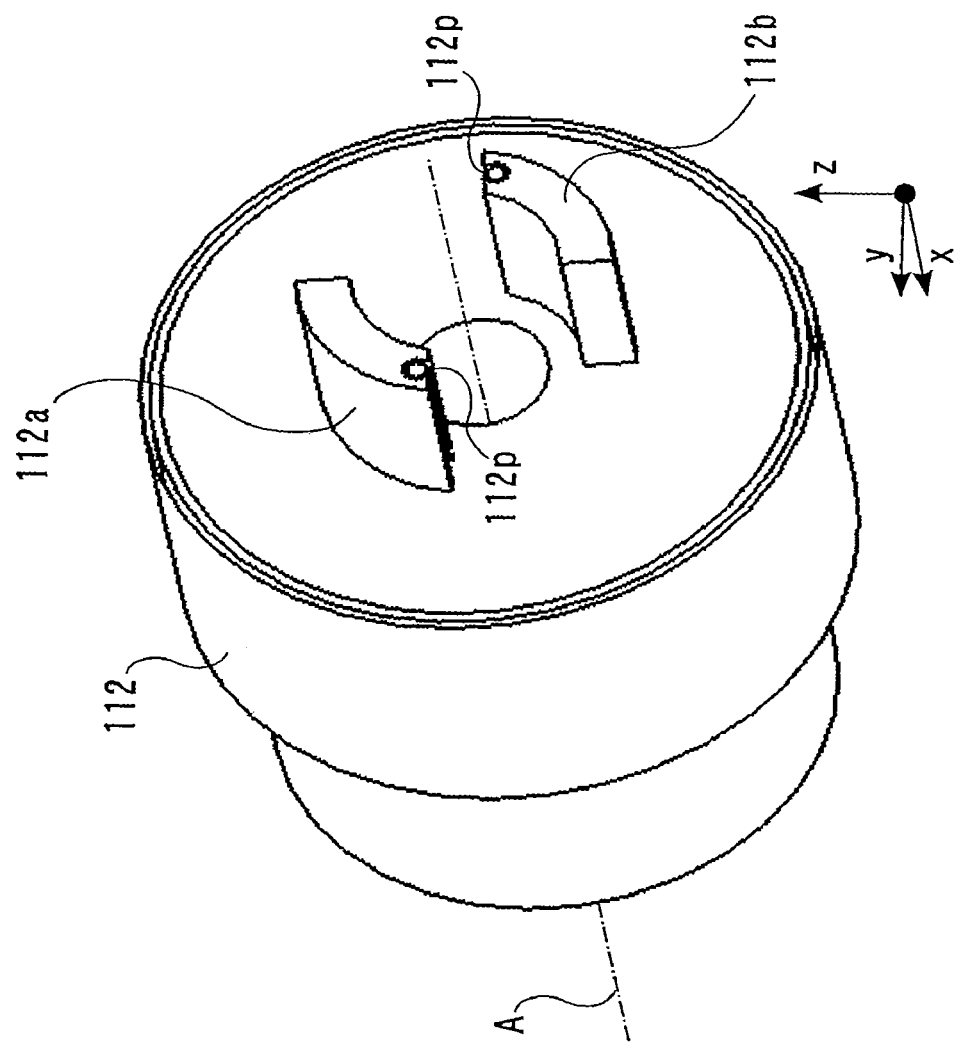
FIG. 6 is a perspective view of a configuration of a first rotating body in the driving force transmitting device according to the first embodiment.
Figure 7:
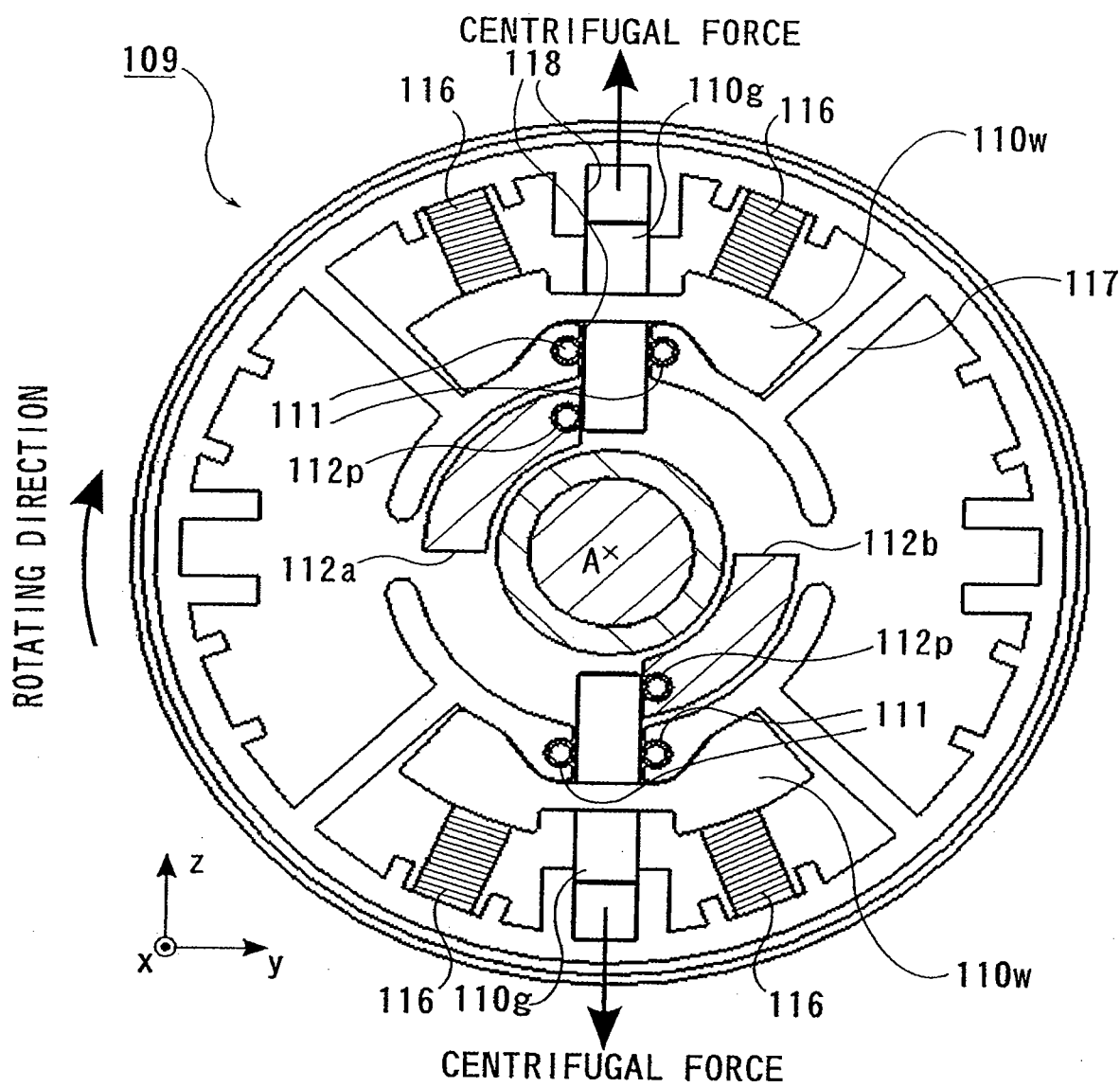
FIG. 7 is a sectional view of a specific configuration of the driving force transmitting device according to the first embodiment.

FIG. 2 is a schematic perspective view of an overview of a driving force transmitting mechanism 1 around the developing device in the image forming apparatus according to this embodiment. FIG. 3 is a plan view of a schematic configuration of the driving force transmitting mechanism 1 around the developing device in the image forming apparatus according to this embodiment. FIG. 4 is a disassembled perspective view of a configuration around a mixer output shaft. FIG. 5 is a disassembled perspective view of a configuration around a driving force transmitting device according to the first embodiment. FIG. 6 is a perspective view of a configuration of a first rotating body in the driving force transmitting device according to the first embodiment. FIG. 7 is a sectional view of a specific configuration of the driving force transmitting device according to the first embodiment.

The driving force transmitting mechanism 1 includes a bearing 101, a rotating shaft 102, a gear 103, a gear 104, a one-way clutch 105, a gear 106, a bearing 107, a mixer output shaft 108, a driving force transmitting device 109, a motor 113, a developing roller output gear 114, and a fixed shaft 115.

The one-way clutch 105 is arranged such that, when torque in a direction in which the gear 104 rotates clockwise (in terms of a rotating direction on the figure) relative to the rotating shaft 102 is applied, the one-way clutch 105 does not transmit the torque (idles) and, when torque in a direction in which the gear 104 rotates counterclockwise relative to the rotating shaft 102 is applied, the one-way clutch 105 transmits the torque.

With the configuration shown in the figure, rotation driving force input from the motor 113 is transmitted to the mixer output shaft 108 and the developing roller output gear 114. The mixer output shaft 108 is directly or indirectly connected to the mixers 4M to 4K to be associated with rotating motions of the mixers 4M to 4K. The developing roller output gear 114 is directly or indirectly connected to the developing rollers 3M to 3K to be associated with rotating motions of the developing rollers 3M to 3K.

A configuration of the driving force transmitting device 109 is explained below.

The driving force transmitting device 109 according to this embodiment includes, for example, a first rotating body 112, a second rotating body 117, weights 110w, engaging members 110g (the weights 110w and the engaging members 110g correspond to the second engaging sections 110), rollers 111 (rollers that come into contact with surfaces of the second engaging sections 110 parallel to the rotation radius direction and rotate following the movement of the second engaging sections 110), first engaging sections 112a and 112b, rollers 112p (rollers provided on surfaces of at least one of the first engaging sections and the second engaging sections opposed to the other), and elastically deforming sections 116.

The respective components configuring the driving force transmitting device 109 are explained in detail below.

The first rotating body 112 is formed in a stepped shape (two steps) in which columns having different outer diameters are integrated (see FIGS. 5 and 6). A gear is formed on an outer circumferential surface of the first rotating body 112. The first rotating body 112 is arranged to be rotatable around a rotation center axis A.

The first engaging sections 112a and 112b are provided to project in the direction of the rotation axis A on an end face on a side of the first rotating body 112 facing the second rotating member 117 (see FIGS. 5 and 6).

In this embodiment, the first engaging sections 112a and 112b are arranged to rotate in association with the developing rollers 3Y to 3K.

The second rotating body 117 is formed in a substantial cylindrical shape and rotates around the rotation axis A the same as that of the first rotating body 112. A gear is formed on an outer circumferential surface of the second rotating body 117 as well.

The elastically deforming sections 116 are, for example, coil springs. One ends of the elastically deforming sections 116 are fixed to an inner circumferential surface of the second rotating body 117. The other ends of the elastically deforming sections 116 are fixed to the second engaging sections 110. Consequently, the second engaging sections 110 are elastically supported by the elastically deforming sections 116. In this embodiment, the elastically deforming sections 116 are arranged to rotate in association with the mixers 4M to 4K.

Conversely, the first engaging sections 112a and 112b can also be arranged to rotate in association with the mixers 4Y to 4K. In this case, the elastically deforming sections 116 are arranged to rotate in association with the developing rollers 3Y to 3K.

Like the elastically deforming sections 116, the second engaging sections 110 are provided in the second rotating body 117 and elastically supported by the elastically deforming sections 116 to engage with the first engaging sections 112a and 112b. The second engaging sections 110 move to an outer side in a rotation radius direction (the direction of centrifugal force shown in FIG. 7) with centrifugal force involved in the rotation of the second rotating body 117 to be thereby disengaged from the first engaging sections 112a and 112b.

The elastically deforming sections 116 are arranged near an upstream side and near a downstream side of the second engaging sections 110 in the rotating direction of the second rotating body 117.

In this way, the second engaging sections 110 are elastically supported on the upstream side and the downstream side in the rotating direction. Consequently, it is possible to suppress occurrence of inclination and positional shift of the second engaging sections 110 on a plane including the rotating direction of the second rotating body 117.

Further, the elastically deforming sections 116 in this embodiment are arranged to generate pressing force in directions substantially parallel to directions toward a rotation center axis of the second rotating body 117 from near the upstream side and near the downstream side of the second engaging sections 110 in the rotating direction of the second rotating body 117.

In this way, since the second engaging sections 110 are elastically supported by the elastic force for pressing the second engaging sections 110 at an angle inclined with respect to moving directions of the second engaging sections 110, it is possible to generate rotating direction components of force applied by the elastically deforming sections 116. Consequently, it is possible to further suppress occurrence of inclination and positional shift of the second engaging sections 110 on the plane including the rotating direction of the second rotating body 117.

Guide sections 118 are provided on an inner wall of the second rotating body 117 and have a role of guiding the movement of the second engaging sections 110 in the rotation radius direction. The guide sections 118 can be members separate from the second rotating body 117. However, in this embodiment, the guide sections 118 are integrally molded with the second rotating body 117 (e.g., by resin molding).

Consequently, it is possible to regulate the moving direction of the second engaging sections 110 following the centrifugal force to the rotation radius direction of the second rotating body 117 (see FIG. 7). When the first engaging sections 112a and 112b and the engaging members 110g of the second engaging sections 110 engage, even if impact force is applied to thereto, it is possible to stably guide the second engaging sections 110. Consequently, it is possible to realize stable torque transmission in the driving force transmitting device.

The rollers 111 are provided in the guide sections 118, come into contact with surfaces of the engaging members 110g of the second engaging sections 110 parallel to the rotation radius direction, and rotate following the movement in the rotation radius direction of the second engaging section 110.

Consequently, frictional resistance between the engaging members 110g and wall surfaces of the guide sections 118 during the movement in the rotation radius direction of the second engaging sections 110 is reduced. It is possible to realize smooth movement corresponding to centrifugal force of the second engaging sections 110.

In the configuration explained above as an example, the rollers 111 are provided on the guide sections 118 side. However, it goes without saying that the rollers 111 may be provided on the wall surfaces of the engaging members 110 to reduce frictional resistance between the engaging members 110 and guide surfaces of the guide sections 118.

Similarly, it is desirable that the surfaces of at least one of the first engaging sections 112a and 112b and the second engaging sections 110 opposed to the other are formed in a convex shape.

In this embodiment, the rollers 112p are provided on surfaces of the first engaging sections 112a and 112b opposed to the engaging members 110g in a state in which the first engaging sections 112a and 112b and the engaging members 110g are engaged. The arrangement of the rollers 112p is not limited to this. It goes without saying that the rollers 112*p* may be provided, for example, on surfaces of the engaging members 110*g* opposed to the first engaging sections 112*a* and 112*b*.

By adopting such a configuration, it is possible to reduce an area of contact of the first engaging sections 112*a* and 112*b* and the second engaging sections 110 in a state in which the engaging sections are engaged. Consequently, it is possible to prevent, as much as possible, contact resistance in that state from suppressing the movement in the rotation radius direction of the second engaging sections 110.

Figure 8:
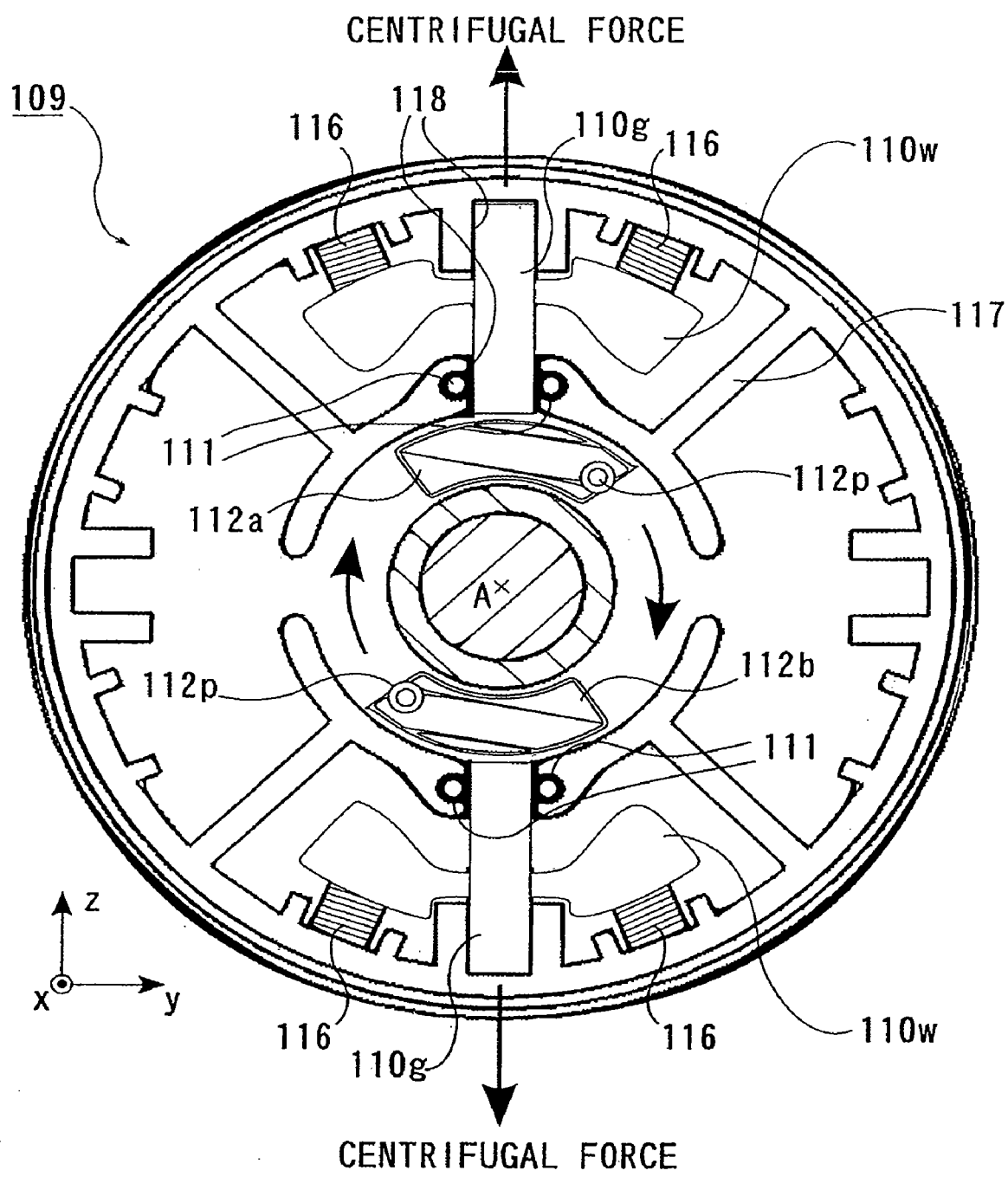
FIG. 8 is a sectional view of a state in which second engaging sections and first engaging sections and are disengaged.

With such a configuration, when the driving force transmitting device 109 rotates at the number of revolutions equal to or higher than a certain number of revolutions, the driving force transmitting device 109 moves, with centrifugal force involved in the rotating motion, the second engaging sections 110 to the outer side in the rotation radius direction overcoming the elastic force of the elastically deforming section 116 and disengages the second engaging sections 110 and the first engaging sections 112*a* and 112*b*. FIG. 8 is a sectional view of a state in which the second engaging sections 110 and the first engaging sections 112*a* and 112*b* are disengaged.

The driving force transmitting device 109 according to this embodiment functions as a clutch that transmits driving force when rotating at the number of revolutions equal to or lower than a predetermined number of revolutions and releases coupling and does not transmit the driving force when rotating at the number of revolutions exceeding the predetermined number of revolutions. Consequently, it is possible to transmit driving force received by one of the first rotating body 112 and the second rotating body 117 to the other or idle the rotating bodies.

A driving force transmission path in the driving force transmitting mechanism according to this embodiment having the configuration is explained below.

A driving force transmission path during low-speed rotation of the motor 113 is explained with reference to FIG. 9.

First, a driving force transmission path for transmitting driving force from the motor 113 to the mixers 4Y to 4K is explained.

Figure 9:
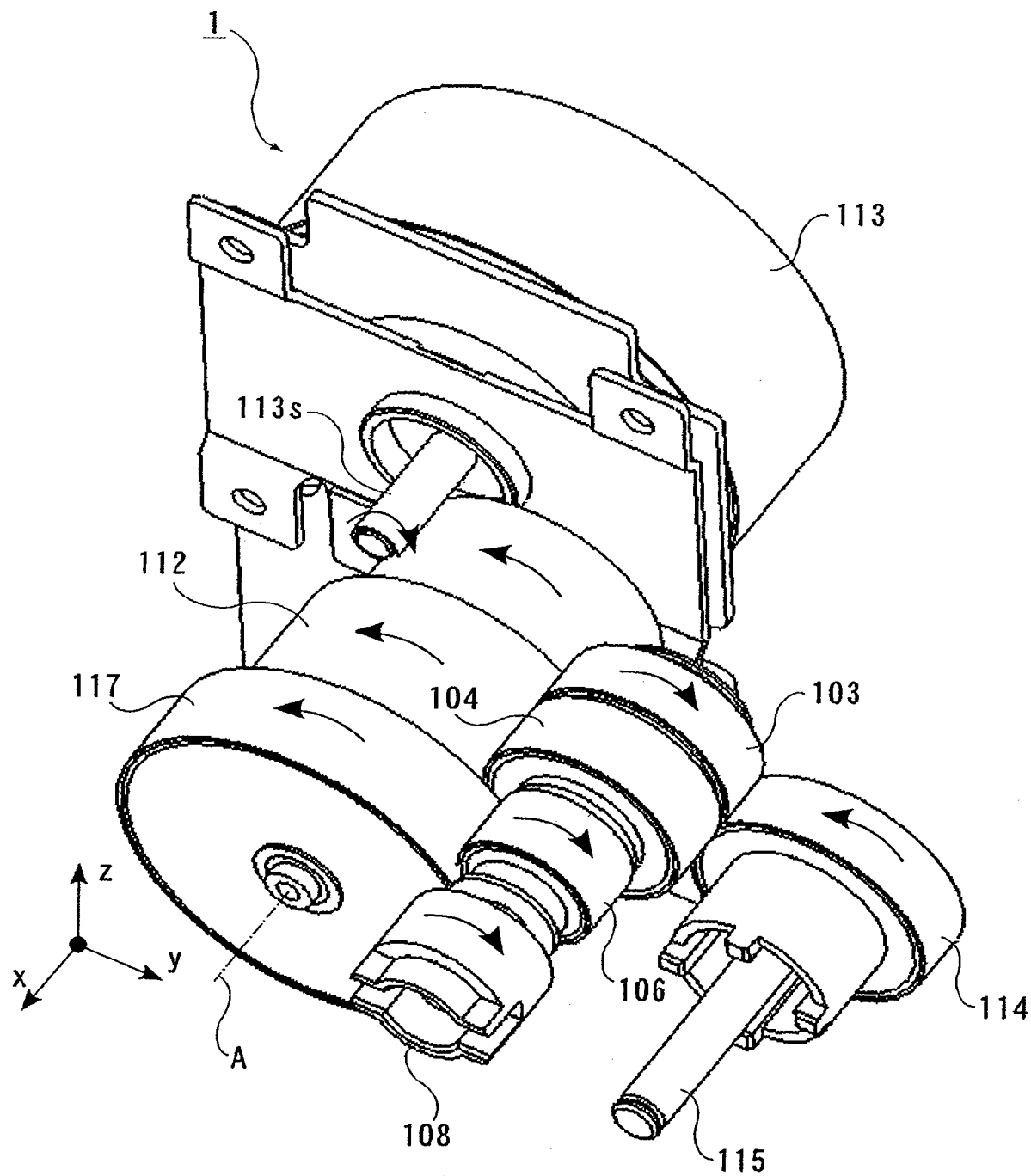
FIG. 9 is a perspective view of a transmission path of driving force during low-speed rotation of a motor.

According to the rotation of a motor shaft of the motor 113, a gear 113*s* directly coupled to the motor shaft rotates in an arrow direction shown in FIG. 9.

When the gear 113*s* and the first rotating body 112, on the outer circumferential surface of which the gear is formed, rotate in arrow directions, respectively, in association with each other, driving force from the motor 113 is transmitted to the first rotating body 112.

When the first rotating body 112 is rotating at low speed, since the first rotating body 112 and the second rotating body 117 are coupled, the driving force transmitted to the first rotating body 112 is transmitted to the second rotating body 117, on the outer circumferential surface of which the gear is formed.

The driving force transmitted to the second rotating body 117 is transmitted to the gear 106 according to meshing of the gears.

The rotation driving force transmitted to the gear 106 is transmitted to the mixer output shaft 108 via the rotating shaft 102. The mixers 4Y to 4K are driven to rotate by this driving force.

A driving force transmission path for transmitting driving force from the motor 113 to the developing rollers 3Y to 3K is explained.

According to the rotation of the motor shaft of the motor 113, the gear 113*s* directly coupled to the motor shaft rotates in the arrow direction shown in FIG. 9.

When the gear 113*s* and the first rotating body 112, on the outer circumferential surface of which the gear is formed, rotate in the arrow directions, respectively, in association with each other, driving force from the motor 113 is transmitted to the first rotating body 112.

The rotation driving force transmitted to the first rotating body 112 is transmitted to the gear 103 according to meshing of the gears.

The rotation driving force transmitted to the gear 103 is transmitted to the developing roller output gear 114 via the rotating shaft 102 and the developing rollers 3Y to 3K are driven to rotate. At this point, the gear 104 is idling according to an action of the one-way clutch 105.

A driving force transmission path during rotation of the motor 113 at high speed enough for disengaging the first engaging sections 112*a* and 112*b* and the second engaging sections 110 is explained with reference to FIG. 10.

First, a driving force transmission path for transmitting driving force from the motor 113 to the mixers 4Y to 4K is explained.

Figure 10:
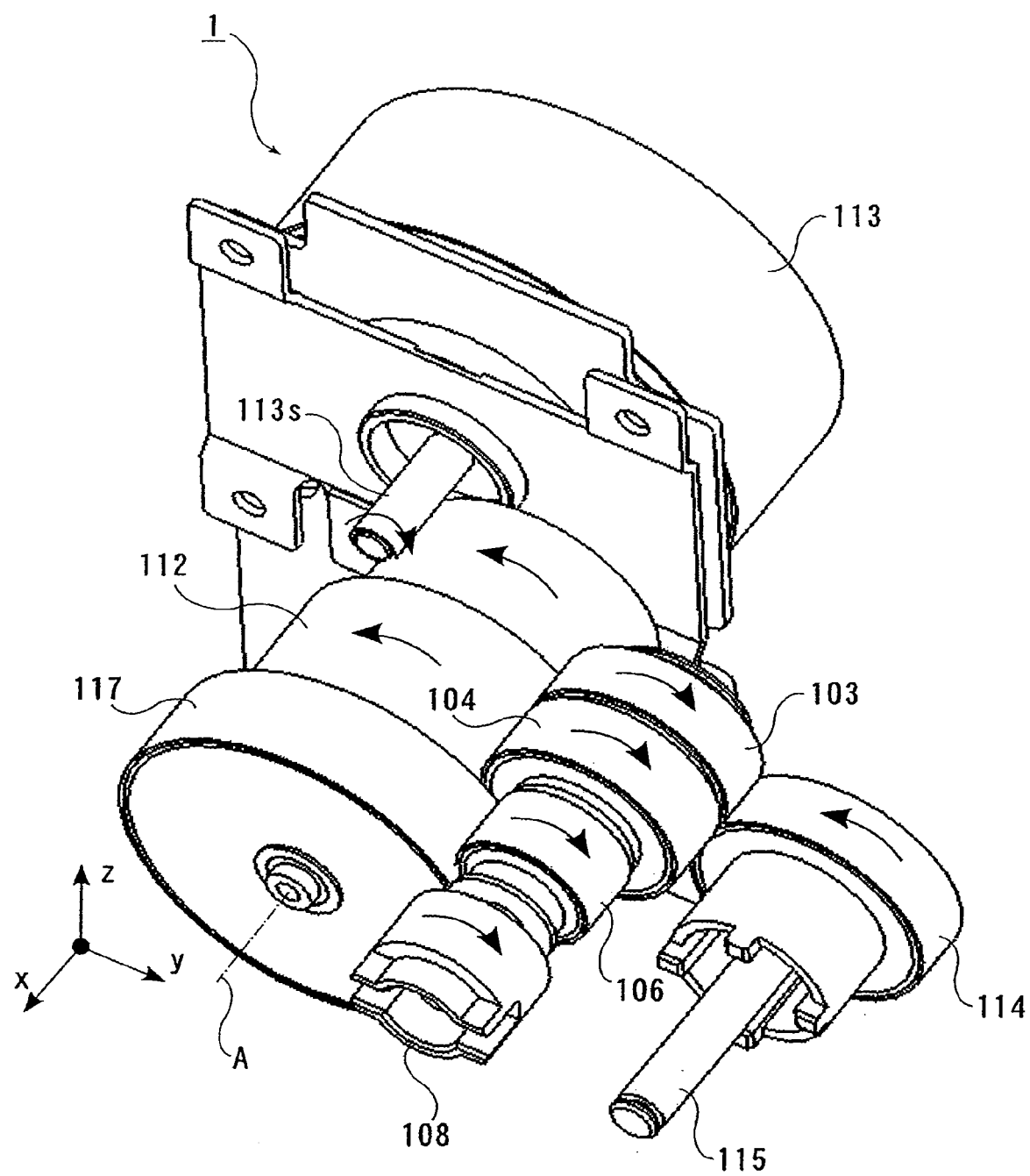
FIG. 10 is a perspective view of a transmission path of driving force during high-speed rotation of the motor.

According to the rotation of the motor shaft of the motor 113, the gear 113*s* directly coupled to the motor shaft rotates in an arrow direction shown in FIG. 10.

When the gear 113*s* and the first rotating body 112, on the outer circumferential surface of which the gear is formed, rotate in arrow directions, respectively, in association with each other, driving force from the motor 113 is transmitted to the first rotating body 112.

When the first rotating body 112 is rotating at high speed enough for preventing the first rotating body 112 and the second rotating body 117 from transmitting power to each other with an action of centrifugal force, the driving force transmitted to the first rotating body 112 is not transmitted to the second rotating body 117.

The driving force transmitted to the first rotating body 112 is transmitted to the gear 104 according to meshing of the gears.

The rotation driving force transmitted to the gear 104 is transmitted to the rotating shaft 102 via the one-way clutch 105 and transmitted to the mixer output shaft 108 via the rotating shaft 102. The mixers 4Y to 4K are driven to rotate by this driving force.

A driving force transmission path for transmitting driving force from the motor 113 to the developing rollers 3Y to 3K is explained.

According to the rotation of the motor shaft of the motor 113, the gear 113*s* directly coupled to the motor shaft rotates in the arrow direction shown in FIG. 10.

When the gear 113*s* and the first rotating body 112, on the outer circumferential surface of which the gear is formed, rotate in the arrow directions, respectively, in association with each other, driving force from the motor 113 is transmitted to the first rotating body 112.

The rotation driving force transmitted to the first rotating body 112 is transmitted to the gear 103 according to meshing of the gears.

The rotation driving force transmitted to the gear 103 is transmitted to the developing roller output gear 114 via the rotating shaft 102 and the developing rollers 3Y to 3K are driven to rotate.

At this point, the first rotating body 112 and the second rotating body 117 in the driving force transmitting device 109 are prevented from transmitting power to each other by the action of centrifugal force.

In the example of the configuration of the driving force transmitting device according to this embodiment explained above, the transmission of the driving force is released by the centrifugal force generated according to the rotation of the rotating bodies. However, the configuration of the driving force transmitting device is not limited to this. It goes without saying that the first engaging sections and the second engaging sections may be engaged by centrifugal force, which is generated when the rotating bodies rotate at the number of revolutions exceeding a predetermined number of revolutions, to transmit driving force (the first engaging sections and the second engaging sections idle during low-speed rotation and do not transmit driving force).

In the example of the configuration explained above, the elastically deforming sections 116 are the coil springs. However, the elastically deforming sections 116 only have to be elastically deformed by centrifugal force involved in the rotation of the second rotating body 117 and are not limited to the coil springs. Therefore, it is also possible to adopt leaf springs and cushion dumpers as the elastically deforming sections 116.

In the example of the configuration explained above, the second engaging sections 110 and the elastically deforming sections 116 are the separate members. However, the second engaging sections 110 and the elastically deforming sections 116 are not limited to this. For example, the second engaging sections 110 and the elastically deforming sections 116 may be integrally molded by a resin material or the like. In this case, sections functioning as the elastically deforming sections 116 are preferably formed in a shape for allowing the sections to function as, for example, springs.

In the example of the configuration explained above, the second engaging sections 110 are located further on the outer side than the first engaging sections 112a and 112b in the rotation radius direction. However, the driving force transmitting device is not limited to such a configuration. It goes without saying that, for example the second engaging sections 110 may be located further on an inner side in the rotation radius direction than the first engaging sections 112a and 112b (i.e., the second engaging sections 110 are closer to the rotation center axis than the first engaging sections 112a and 112b).

In the configuration in this embodiment in which the second engaging sections 110 are located further on the outer side in the rotation radius direction than the first engaging sections 112a and 112b, since the elastically deforming sections 116 and the second engaging sections 110 are provided on the outer side in the rotation radius direction, it is easy to secure an arrangement space compared with the configuration in which the second engaging sections 110 are arranged on the inner side in the rotation radius direction.

In the example of the configuration explained above, the engaging members 110g and the weights 110w configuring the second engaging sections 110 are integrally formed and the sufficient centrifugal force is generated by the weights 110w. However, for example, when the mass of the engaging members 110g themselves is enough for movement by centrifugal force, the weights 110w do not always have to be provided.

With the driving force transmitting device according to this embodiment, it is possible to release transmission of driving force at an arbitrary number of revolutions by adjusting the number of revolutions and the mass and setting positions of the second engaging sections 110. There is an effect that it is easy to perform control for transmission of the driving force and idling.

In this embodiment, engaging positions of the first engaging sections and the second engaging sections are provided in two places. However, the engaging positions are not limited to this. It goes without saying that, for example, when it is desired to transmit higher-torque driving force, the engaging positions of the first engaging sections and the second engaging sections may be provided in three or more places. When rigidity of the first engaging sections and the second engaging sections is sufficient and relative rotational motion of the first rotating body and the second rotating body can be smoothly performed, the first engaging sections and the second engaging sections may be engaged in one place.

In the past, in a driving device of a developing device, a configuration for rotating mixers and developing rollers in association with each other is generally adopted. However, in this configuration in the past, it is likely that the number of revolutions of the mixers fall according to the fall in the number of revolutions of the developing rollers, sufficient agitation of developers is difficult, and an image failure occurs.

On the other hand, if the driving force transmitting device according to this embodiment is used for transmission of rotation driving force between the developing rollers and the mixers, even when the number of revolutions of the developing rollers exceeds a predetermined number of revolutions, driving force is not transmitted between the developing rollers and the mixers. Therefore, it is possible to realize an effect that it is possible to control the number of revolutions of the mixers not to exceed the number of revolutions that is likely to cause an image failure (maintain an appropriate number of agitating revolutions of the mixers).

Second Embodiment

A second embodiment of the present invention is explained below. Explanation of components having functions the same as those of the components explained in the first embodiment is omitted.

In an image forming apparatus according to this embodiment, at least one of photoconductive members and developing rollers of developing devices are driven by driving force from a first driving source. Developers in the developing devices are agitated by mixers driven by driving force from a second driving source different from the first driving source. In other words, a driving source for the mixers is provided separately from a driving source for the photoconductive members and a driving source for the developing rollers, whereby the number of revolutions of the mixers is independently controlled.

According to this embodiment, for example, even when the number of revolutions of the developing rollers is so low as to adversely affect maintenance of an image quality, it is possible to independently control the number of revolutions of the mixers at an appropriate level. Therefore, it is possible to contribute to improvement in maintenance of an image quality as an image forming apparatus.

Third Embodiment

A third embodiment of the present invention is explained. Explanation of components having functions the same as those of the components explained in the first embodiment is omitted.

In an image forming apparatus according to this embodiment, developing rollers of developing devices are driven to rotate by driving force from a driving source. Developers in the developing devices are agitated by mixers driven to rotate by the driving force transmitted from the developing roller via a continuously variable transmission mechanism (corresponding to so-called continuously variable transmission: CVT). In other words, in this embodiment, the developing rollers and the mixers are driven to rotate by driving force input from the same driving source.

Consequently, even in a state in which the number of revolutions of the developing roller is high, it is possible to maintain the number of revolutions of the mixers at the number of revolutions equal to or lower than the number of revolutions that is likely to cause an image failure.

The present invention has been explained in detail with reference to the specific embodiments. However, it would be apparent to those skilled in the art that various modifications and alterations are possible without departing from the spirit and the scope of the present invention.

As explained above in detail, according to the embodiments of the present invention, it is possible to provide a technique that makes it possible to switch high-torque power transmission with a compact and simple configuration.

What is claimed is:

1. A driving force transmitting device comprising:
a first rotating body having a first engaging section; and
a second rotating body that rotates around a rotating shaft that is the same as that of the first rotating body and having:
elastically deforming sections,
a second engaging section that is elastically supported by the elastically deforming sections and configured to engage with the first engaging section or disengage from the first engaging section by moving to an outer side in a rotation radius direction by centrifugal force, and
a guide section to guide the movement of the second engaging section in the rotation radius direction.

2. The device according to claim 1, wherein the elastically deforming sections are arranged near an upstream side and near a downstream side of the second engaging section in a rotating direction of the second rotating body.

3. The device according to claim 2, wherein the elastically deforming sections generate pressing force in directions toward a rotation center axis of the second rotating body from near the upstream side and near the downstream side of the second engaging section in the rotating direction of the second rotating body.

4. The device according to claim 1, wherein the guide section includes a roller that comes into contact with a surface of the second engaging section parallel to the rotation radius direction and rotates according to the movement of the second engaging section in the rotation radius direction.

5. The device according to claim 1, wherein the elastically deforming sections include at least one of coil springs, leaf springs, cushion dumpers, and resin members molded in a spring shape.

6. The device according to claim 1, wherein a surface of at least one of the first engaging section and the second engaging section opposed to the other is formed in a convex shape.

7. The device according to claim 1, further comprising a roller provided on a surface of at least one of the first engaging section and the second engaging section opposed to the other.

8. An image forming apparatus comprising:
a developing roller of a developing device that is driven by driving force from a driving source;
an agitating unit that agitates a developer in the developing device;
a first engaging section that rotates integrally with one of the developing roller and the agitating unit;
elastically deforming sections that rotate integrally with the other of the developing roller and the agitating unit; and
a second engaging section that is provided in the other of the developing roller and the agitating unit than the first engaging section, elastically supported by the elastically deforming sections, and configured to engage with the first engaging section or disengage from the first engaging section by moving to an outer side in a rotation radius direction by centrifugal force,
wherein the other of the developing roller and the agitating unit includes a guide section to guide the movement of the second engaging section in the rotation radius direction.

9. The apparatus according to claim 8, wherein the elastically deforming sections are arranged near an upstream side and near a downstream side of the second engaging section in a rotating direction of the other of the developing roller and the agitating unit.

10. The apparatus according to claim 9, wherein the elastically deforming sections generate pressing force in directions toward a rotation center axis of the other of the developing roller and the agitating unit from near the upstream side and near the downstream side of the second engaging section in the rotating direction of the other of the developing roller and the agitating unit.

11. The apparatus according to claim 8, wherein the guide section includes a roller that comes into contact with a surface of the second engaging section parallel to the rotation radius direction and rotates according to the movement of the second engaging section in the rotation radius direction.

12. The apparatus according to claim 8, wherein the elastically deforming sections include at least one of coil springs, leaf springs, cushion dumpers, and resin members molded in a spring shape.

13. The apparatus according to claim 8, wherein a surface of at least one of the first engaging section and the second engaging section opposed to the other is formed in a convex shape.

14. The apparatus according to claim 8, further comprising a roller provided on a surface of at least one of the first engaging section and the second engaging section opposed to the other.

15. A driving force transmitting method in an image forming apparatus including a developing roller of a developing device that is driven by driving force from a driving source, an agitating unit that agitates a developer in the developing device, a first engaging section that rotates in association with one of the developing roller and the agitating unit, elastically deforming sections that rotate in association with the other of the developing roller and the agitating unit, and a second engaging section that is provided in the other of the developing roller and the agitating unit than the first engaging section, elastically supported by the elastically deforming sections, and configured to engage with the first engaging section or disengage from the first engaging section,
the method comprising moving the second engaging section to an outer side in a rotation radius direction by centrifugal force involved in the rotation of the other of the developing roller and the agitating unit to thereby disengage the second engaging section from the first engaging section,
wherein the other of the developing roller and the agitating unit includes a guide section to guide the movement of the second engaging section in the rotation radius direction.

16. The method according to claim 15, wherein the guide section includes a roller that comes into contact with a surface of the second engaging section parallel to the rotation radius direction and rotates according to the movement of the second engaging section in the rotation radius direction.

* * * * *